(12) United States Patent
Pruehs et al.

(10) Patent No.: US 8,547,686 B2
(45) Date of Patent: Oct. 1, 2013

(54) WATTHOUR METER SOCKET WITH SECURED ACCESS HIGH VOLTAGE SECTION

(75) Inventors: Allen Pruehs, Howell, MI (US); Jeffrey J. Hanft, Commerce Township, MI (US)

(73) Assignee: Meter Devices Company, Inc., Canton, OH (US)

( * ) Notice: Subject to any disclaimer, the term of this patent is extended or adjusted under 35 U.S.C. 154(b) by 0 days.

(21) Appl. No.: 12/276,891

(22) Filed: Nov. 24, 2008

(65) Prior Publication Data

US 2010/0128418 A1 May 27, 2010

(51) Int. Cl.
*H02B 1/00* (2006.01)
*G01R 1/04* (2006.01)

(52) U.S. Cl.
USPC ............ 361/664; 361/659; 361/661; 361/667

(58) Field of Classification Search
USPC ................... 361/641, 643, 659–672; 324/74, 324/110, 142, 156; 439/146, 167, 508, 517; 29/592.1; D10/100
See application file for complete search history.

(56) References Cited

U.S. PATENT DOCUMENTS

| | | | | |
|---|---|---|---|---|
| 1,898,634 A * | 2/1933 | Lewis | ............................ | 361/663 |
| 2,013,525 A * | 9/1935 | Reed | ............................ | 361/605 |
| 2,182,603 A * | 12/1939 | Walker et al. | .................. | 361/667 |
| 3,025,432 A * | 3/1962 | Giegerich | ...................... | 361/643 |
| 3,397,346 A * | 8/1968 | Sloop | ............................. | 361/666 |
| 3,744,010 A | 7/1973 | Meacham | | |
| 3,906,295 A * | 9/1975 | Tessmer | ........................ | 361/643 |
| 4,025,825 A | 5/1977 | Shrader | | |
| 4,226,102 A * | 10/1980 | Mattress, Jr. | ..................... | 70/164 |
| 4,249,227 A * | 2/1981 | Kato et al. | ..................... | 361/622 |
| 4,404,521 A | 9/1983 | Fennell | | |
| 4,888,448 A * | 12/1989 | Moerman | ........................ | 174/38 |
| 4,998,612 A | 3/1991 | Halsey et al. | | |
| 5,033,973 A * | 7/1991 | Pruehs et al. | .................. | 439/167 |
| 5,041,001 A * | 8/1991 | Giles | ............................. | 439/189 |
| 5,097,383 A * | 3/1992 | Heard et al. | ................... | 361/662 |
| 5,121,824 A | 6/1992 | Halsey et al. | | |
| 5,145,403 A * | 9/1992 | Schaffert et al. | .............. | 439/508 |
| 5,216,802 A * | 6/1993 | Cole et al. | ........................ | 29/825 |
| 5,404,266 A * | 4/1995 | Orchard et al. | ................ | 361/667 |

(Continued)

FOREIGN PATENT DOCUMENTS

| | | | |
|---|---|---|---|
| EP | 1538449 A2 * | 6/2005 | |
| JP | 06253422 A * | 9/1994 | |
| WO | WO 02088642 A1 * | 11/2002 | |
| WO | WO 2005001994 A2 * | 1/2005 | |

OTHER PUBLICATIONS

Transformer Rated Meter Sockets, Series 3000, Meter Devices Company, Inc., 1998.*

(Continued)

*Primary Examiner* — Anatoly Vortman
(74) *Attorney, Agent, or Firm* — Young Basile Hanlon & MacFarlane P.C.

(57) ABSTRACT

An electrical watthour meter socket includes a first sub-enclosure receiving high voltage components and a second sub-enclosure receiving lower voltage components. The first and second sub-enclosures are electrically isolated from each other access control components to allow independent access to lower voltage components in the second sub-enclosure without the use of personal protective equipment required for exposure to components carrying high voltage.

8 Claims, 8 Drawing Sheets

(56) References Cited

U.S. PATENT DOCUMENTS

| | | | | |
|---|---|---|---|---|
| 5,418,683 A | * | 5/1995 | Orchard et al. | 361/672 |
| 5,546,269 A | * | 8/1996 | Robinson et al. | 361/660 |
| 5,572,396 A | * | 11/1996 | Robinson | 361/117 |
| 5,638,256 A | * | 6/1997 | Leach et al. | 361/641 |
| 5,774,328 A | * | 6/1998 | Rector et al. | 361/667 |
| 5,834,932 A | * | 11/1998 | May | 324/107 |
| 5,870,276 A | * | 2/1999 | Leach et al. | 361/627 |
| 5,997,347 A | * | 12/1999 | Robinson et al. | 439/517 |
| 6,046,904 A | * | 4/2000 | Kubat | 361/659 |
| 6,254,437 B1 | | 7/2001 | Carroll et al. | |
| 6,266,233 B1 | * | 7/2001 | O'Regan | 361/659 |
| 6,384,350 B1 | * | 5/2002 | Shincovich et al. | 200/5 A |
| 6,421,229 B1 | * | 7/2002 | Campbell et al. | 361/622 |
| 6,504,268 B1 | * | 1/2003 | Flegel | 307/85 |
| 6,545,374 B1 | * | 4/2003 | Allenbach | 307/125 |
| 6,589,072 B2 | * | 7/2003 | Robinson et al. | 439/517 |
| 6,605,937 B2 | * | 8/2003 | Germer et al. | 324/157 |
| 6,687,627 B1 | * | 2/2004 | Gunn et al. | 702/61 |
| 6,773,652 B2 | * | 8/2004 | Loy et al. | 264/274 |
| 6,798,191 B1 | * | 9/2004 | Macfarlane et al. | 324/157 |
| 6,940,711 B2 | * | 9/2005 | Heuell et al. | 361/668 |
| 6,956,733 B2 | * | 10/2005 | Beasley et al. | 361/641 |
| 7,199,572 B1 | | 4/2007 | May | |
| 7,239,502 B1 | * | 7/2007 | Seff et al. | 361/624 |
| 7,265,532 B2 | * | 9/2007 | Karanam et al. | 324/142 |
| 7,286,339 B2 | * | 10/2007 | Baca | 361/643 |
| 7,397,652 B2 | * | 7/2008 | Price et al. | 361/643 |
| 7,479,029 B2 | * | 1/2009 | Cook et al. | 439/517 |
| 7,540,766 B2 | * | 6/2009 | Makinson et al. | 439/517 |
| 2004/0165340 A1 | * | 8/2004 | Wilfong | 361/664 |
| 2005/0239325 A1 | | 10/2005 | Cook et al. | |
| 2005/0270016 A1 | * | 12/2005 | Karanam et al. | 324/157 |
| 2006/0181838 A1 | * | 8/2006 | Ely | 361/622 |
| 2006/0265853 A1 | * | 11/2006 | Povolny | 29/462 |
| 2009/0267466 A1 | * | 10/2009 | Zook et al. | 312/223.6 |

OTHER PUBLICATIONS

Bottom-Fed to Socket-Type Adapters Polyphase Series, 2100 Series, Ekstrom Industries, Inc. 2002.

Marwell Corporation, PO Box 139, Mentone, CA 92359; Marwell News, Sep. 2002, Auto By-Pass Conversion Adapter.

Meter Devices Company, Inc 3359 Bruening Avenue S.W., Canton, Ohio 44706. Lexan Non-Corrosive Prewired Meter Socket Corrosion Free Protection, 2002.

Marwell Corporation, PO Box 3147,San Bernardino, CA 92413; Marwell News, Apr. 1998, Marwell 2200-N with States Test Switch.

Brooks Utility Products Group, 23847 Industrial Park Drive, Farmington Hills, MI. 48335-2583; Trans Sockets, 2001.

Two Sockets Two Meters; http://www.socket-two-me.com/about.php; Aug. 29, 2008; p. 1 of 1.

Two Sockets Two Meters; http://www.socket-two-me.com/productdetail.php; Aug. 29, 2008; p. 1 of 1.

Two Sockets Two Meters; http://www.socket-two-me.com/productdetail.php?i=13; Aug. 29, 2008; p. 1 of 1.

Two Sockets Two Meters; http://www.socket-two-me.com/contact.php Aug. 29, 2008; p. 1 of 1.

Two Sockets Two Meters; http://www.socket-two-me.com/why.php; Aug. 29, 2008; p. 1 of 1.

Problem Solvers for Utilities, 2008 Edition, Brooks Utility Products Group; p. 3, 2008.

Transocket; 200-600 Ampere Instrument Transformers; ABB Inc., Highway 43 North; Pinetops NC 27864; www.abb.com/mediumvoltage, 2003.

Mini-Transocket; Meter Devices Company; 3359 Bruening Avenue S.W., Canton, OH, 44706; www.meter-devices.com, 2001.

Transockets; Meter Devices Company; 3359 Bruening Avenue S.W., Canton, OH, 44706; www.meter-devices.com, 2002.

* cited by examiner

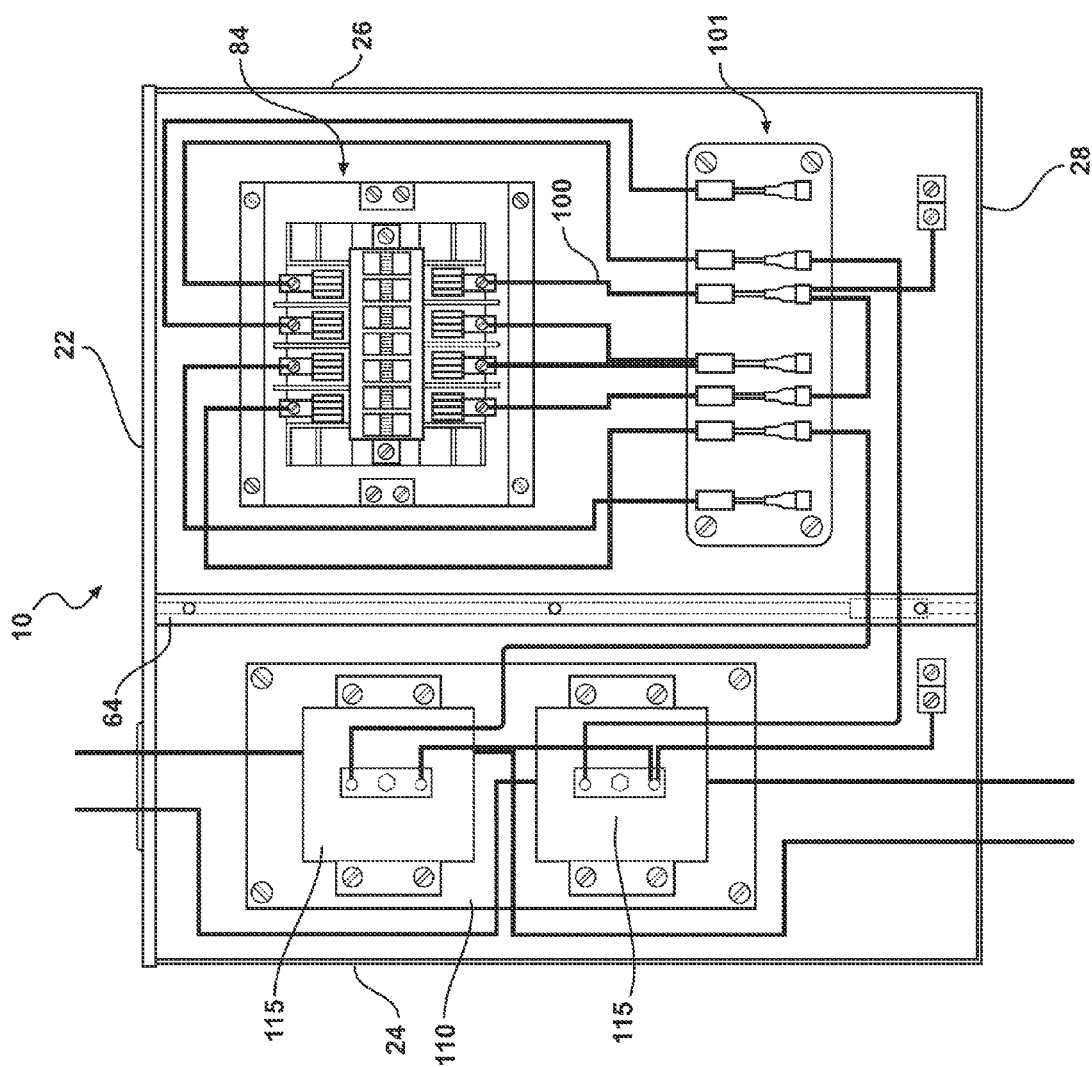

WATTHOUR METER SOCKET WITH SECURED ACCESS HIGH VOLTAGE SECTION

BACKGROUND

The present invention relates, in general, to electrical watthour meters and, specifically, to electrical watthour meter sockets, and more specifically, to watthour meter sockets and bypass devices for use with current and/or potential transformers.

In the electric utility industry, watthour meters are employed to measure electrical power consumption at a residential or commercial building establishment. A cabinet is typically mounted on an inside or outside wall of the residence or building use site and contains a meter socket having line and load contacts which are connected to electric utility power line conductors and electric load conductors connected to the residential or building site power distribution network. The contacts receive blade terminals of a plug-in watthour meter to complete an electric circuit through the meter between the line and load terminals mounted in the cabinet for the measurement of electrical power consumption.

The meter socket is typically mounted on the rear wall of the cabinet by fasteners, such as bolts, which extend through the meter socket into the rear wall. Alternately, the meter socket can be mounted on a separate back panel over threaded studs mounted on the rear wall of the cabinet and extending inward through apertures in the panel to receive nuts.

Current transformer or CT rated watthour meters and socket adapters are employed in high current applications. The current transformers coupled to the line and load conductors have their output leads connected to terminals in a current transformer or CT rated watthour meter socket. A low current rated watthour meter is then plugged into the socket to measure power consumed at the use site.

In addition, potential coils in a watthour meter may also be connected via potential blade terminals to potential jaw contacts mounted in the socket and connected by individual conductors to terminals mounted in the terminal portion of the socket.

However, with current transformer rated socket adapters or sockets, it is necessary to short circuit the line and load terminals when the watthour meter is removed from the socket for replacement or testing. Heretofore, bypass devices, such as test switches or slidable link test blocks have been used with CT rated sockets to provide the necessary short circuit or bypass feature.

Exemplary test switches and link test blocks are made by Meter Devices Company, Inc. of Canton, Ohio. Such bypass devices are typically mounted in a watthour meter socket. The test switches are generally in the form of single throw, knife-type switches which are provided in multiples ganged together into one assembly; but each switch is electrically connected between one line contact or one load contact in the socket and one current transformer lead. Once the socket cover is removed, the test switches can be operated as desired to provide the necessary bypass connection between the line and load contacts and the conductors from the current transformers prior to removing the watthour meter from the socket for testing, recalibration, replacement, etc., and the reinstalling a watthour meter in the socket.

In use, the meter socket itself or the meter socket and a bypass device are mounted in a socket enclosure or housing. The individual socket terminals are then wired to the bypass device terminals.

It is also known to mount a meter socket, such as an Ekstrom Industries, Inc., 2100 Series, bottom feed to socket-type adapter, on a mounting panel along with a bypass test switch assembly. The meter socket and the test switch assembly are then mounted by fasteners on a meter enclosure back panel or in a meter socket housing Ekstrom Industries, Inc. has sold a 2100 adapter with built-in or integrally mounted test switches which are mounted below the socket adapter jaw contacts in place of the normal power terminals as shown in U.S. Pat. Nos. 6,475,028 and 6,488,535.

440/480 volt single or three-phase service is typically provided to large electric power users. Due to the high current requirements of such high power users, current transformers are typically coupled to the utility power conductors. However, the 440/480 voltage provided at the current transformers remains unchanged by the current transformers thereby requiring an expensive 480 volt-rated watthour meter for power measurement.

However, 480 volt-rated equipment is more volatile and more susceptible to failure, such as arc faults which can lead to phase-to-phase or phase-to-neutral faults and potentially cause a full flashover event.

In addition, high transient voltage spikes, due to lightening strikes, line surges, fault currents, etc., could cause voltages that exceed the meter or meter socket capacity. Old-style watthour meters incorporated surge gaps to provide over-voltage to ground protection, such as from a lightening strike. Such surge gaps provide protection for over 1,000 volts for short periods. However, existing electrical power standards do not require watthour meters to have surge gaps and thus most watthour meter manufacturers incorporate metal oxide varistors (MOV) in their meters.

This poses a problem since the MOVs do not provide much protection over 1,000 volts. In addition, ferroresonance which may be present when a watthour meter is plugged into the socket base could cause voltage spikes greater than 1,000 volts leading to meter failure and an explosive event within the meter socket posing hazards to any utility service personnel accessing the socket.

At the same time, it still remains extremely dangerous for utility personnel to work on 480 volt equipment when live voltage is present on such equipment. Such high voltage work requires the use of personal protection equipment in the form of full body suits, masks, etc.

One prior attempt to address these problems associated with working with live 480V equipment involved the use of 480V/120V potential transformers mounted in the socket next to the meter socket base and/or optional meter test switches. The potential transformers transform the high 480 volt to lower 120 volt service. This allowed the use of less expensive and more easily handled 120 volt rated watthour meters.

Another prior attempt to address these concerns involved the mounting of a VT-pack voltage transformer assembly manufactured by Two Sockets-Two Meters, Inc., of South Dakota. The VT-pack is in the form of a small housing carrying three voltage transformers which transform the 480 volt service to 120 volt service or output conductors coupled to the voltage transformers. The output conductors are connected to a plug-in connector which receives a mating connector plug coupled at one end of a wiring harness which is pre-wired to the meter socket jaw contacts and/or optional meter test switches.

However, these designs still place the 480 volt rated equipment in the same cabinet or enclosure with the watthour meter equipment thereby necessitating the use of full personal protective equipment by the utility service person when installing, removing or otherwise servicing the watthour meter and/or optional meter test switches in the socket cabinet.

SUMMARY

A watthour meter socket includes the first and second sub-enclosures. At least one independent access control component independently controls the access to the first and second sub enclosure portions.

In one aspect, the access control components include first and second covers respectively mounted over the first and second sub enclosures to allow independent and electrically isolated access to each of the first and second sub enclosures.

The enclosure can include a backwall, a pair of opposed sidewalls, a top wall and a bottom wall defining a front opening spaced from the back wall. An interior barrier or barrier wall is disposed intermediate the sidewalls, the top and bottom walls, or the front and back walls and extends substantially completely between the walls. The interior barrier divides the enclosure into the first and second sub-enclosures.

High to low voltage transformers can be mounted in the first sub enclosure. Lower voltage carrying conductors extend from the transformers in the first sub enclosure through the interior barrier to the second sub enclosure. The high to low voltage transformers may be 480V voltage transformers.

The access control components may include a single cover covering the first and second sub-enclosures interior cover is disposed over the first sub-enclosure interiorly of the single cover. The interior cover is movable with respect to the first sub-enclosure for controlled access to the high voltage electrical connections within the first sub-enclosure.

In another aspect, the first and second sub-enclosures are arranged front to back within the enclosure. The interior barrier includes a movable panel forming the first and second sub-enclosures within the enclosure. The panel substantially covers the first rearmost located sub-enclosure.

BRIEF DESCRIPTION OF THE DRAWING

The various features, advantages and other uses of the present invention will become more apparent by referring to the following detailed description and drawing in which:

FIG. 9 is a front elevational view of the socket shown in FIG. 1, including current transformers.

DETAILED DESCRIPTION

Referring now to FIGS. 1-8 there is depicted a watthour meter socket 10 suited for wall-mounting and capable of removably receiving a watthour meter socket 12 used to measure electric power consumed at a building or residential site.

Figure 1:
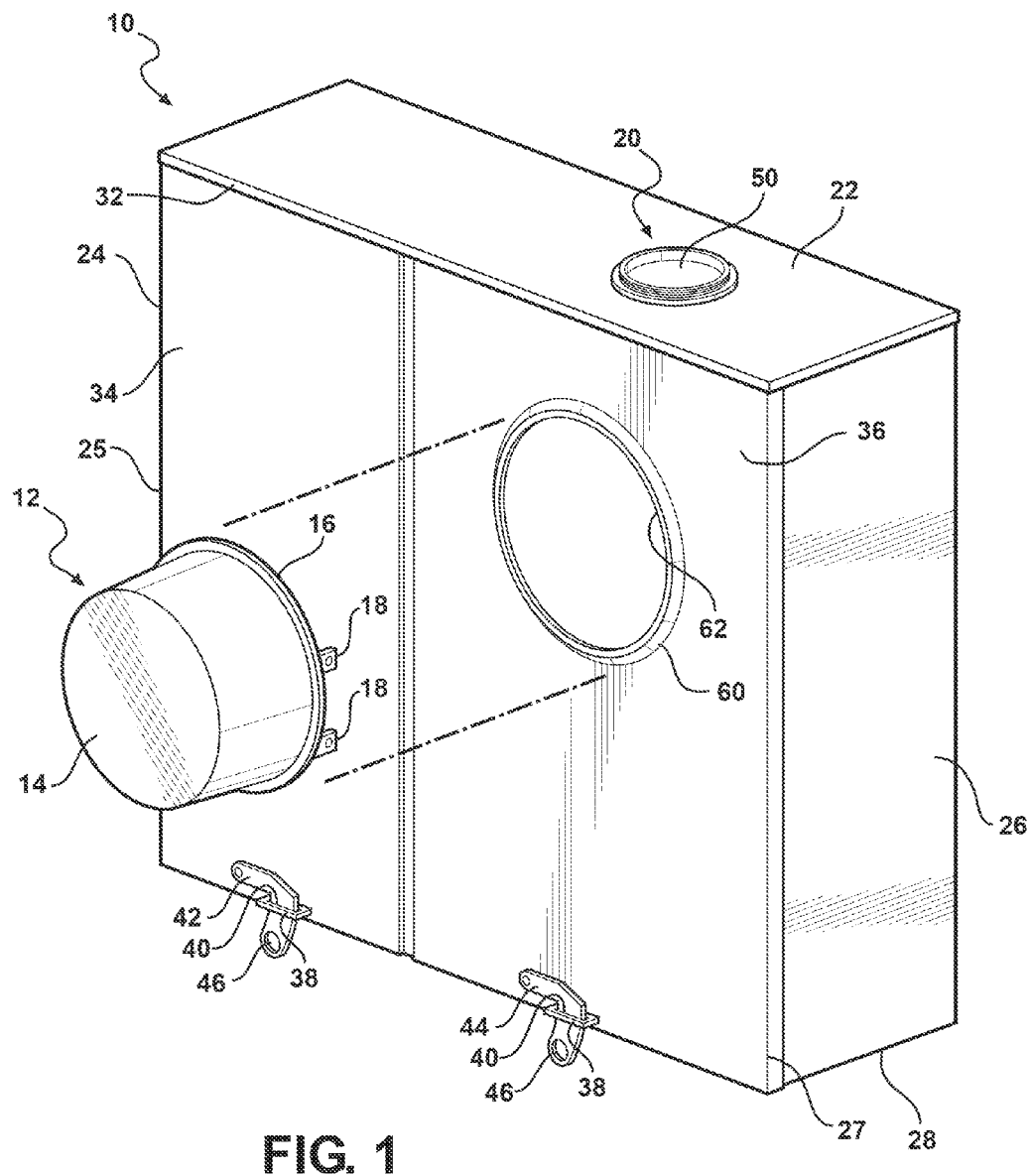
FIG. 1 is a partially exploded, perspective view of an independent access watthour meter socket.
Figure 2:
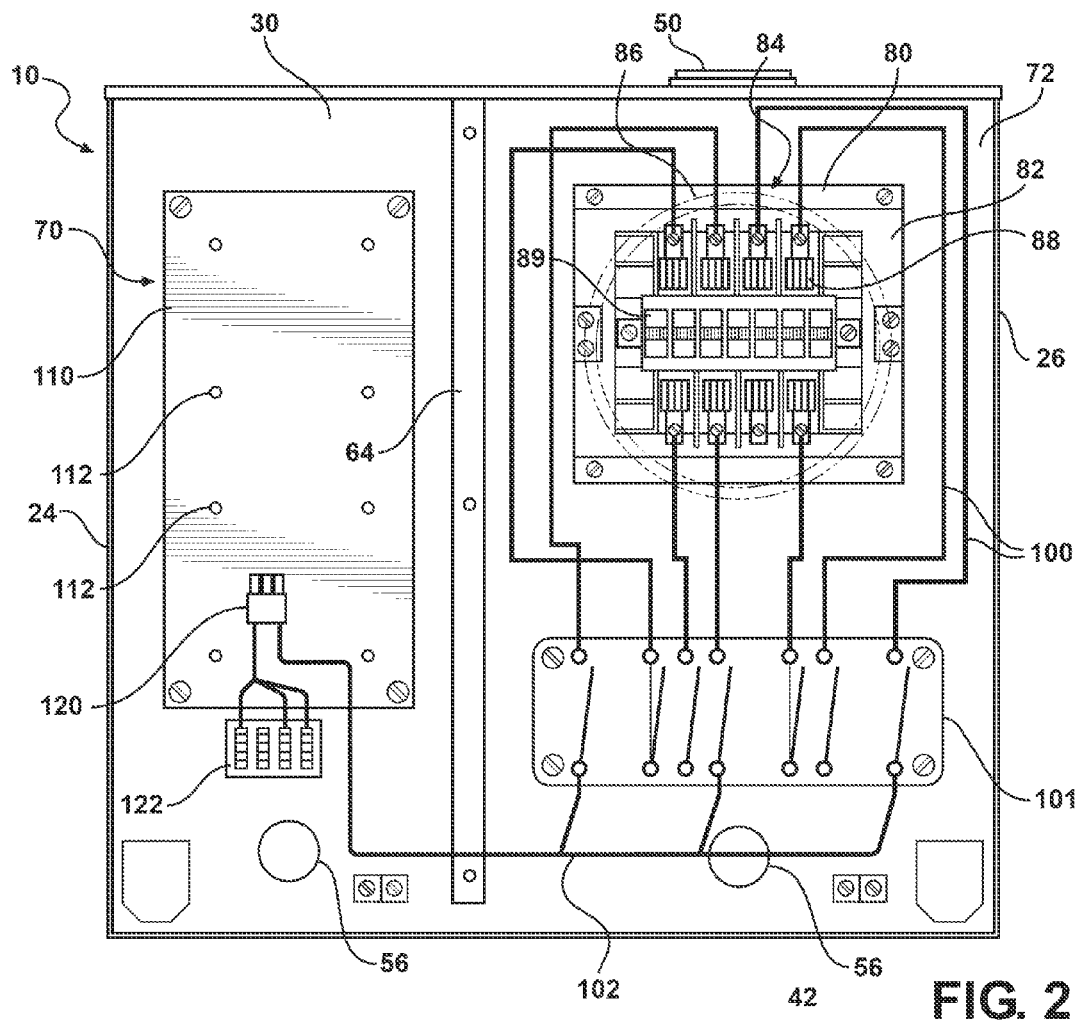
FIG. 2 is a frontal elevational view of the socket shown in FIG. 1, with the two covers and the voltage conversion means removed.
Figure 3:
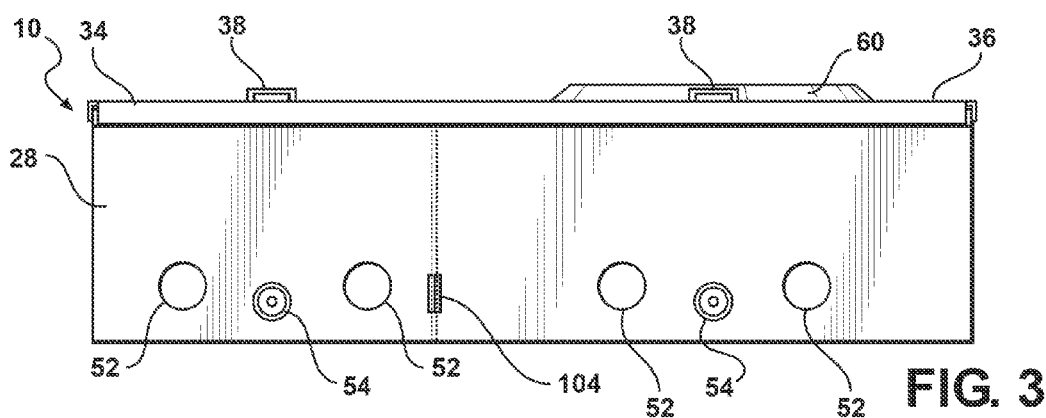
FIG. 3 is a bottom elevational view of the socket shown in FIG. 1.

Although the following description of the watthour meter socket 10 is for a single socket enclosure or housing, it will be understood that the enclosure or housing of the watthour meter 12 may be formed of multiple separate housings which are joined together along two opposed side walls or matching side, top and/or bottom walls of the two housings with the two housings joined by fasteners, welding or other joining means into a unitary one-piece structure capable of being installed as a single unit. The watthour meter 12 may be a conventional electromechanical watthour meter or an electronic watthour meter. The watthour meter 12 includes a dome or housing 14, a radially outward extending, circumferential mounting flange of a base mounting flange 16 and a plurality of blade terminals 18, with only two blade terminals 18 shown in FIG. 1 by way of example, for single phase or three-phase electrical service By way of example only, the watthour meter socket 10 includes a unitary housing 20 formed of a top wall 22, opposed side walls 24 and 26, a bottom wall 28 opposed from the top wall 22, and a rear wall or back pan 30 as shown in FIGS. 1-3.

The top wall 22, the rear wall 30, the side walls 24 and 26, and the bottom wall 28 may be formed of a single piece of metal which is bent to form the top wall 22, the side walls 24 and 26 and the bottom wall 28 generally perpendicular with respect to the rear wall 30. Alternately, the walls 22, 24, 26, 28 and 30 may be formed of individual flat plates which are joined, such as by welding, along adjoining edges, to form the enclosure or housing 20.

The top wall 22 has a depending exterior lip 32 which extends between upper ends of the side walls 24 and 26. First and second door or covers 34 and 36, respectively, each have an offset upper edge for insertion behind the lip 32. This enables the first and second doors 34 and 36, once the offset flanges at the upper edges of each door 34 and 36 is inserted behind the lip 32, to be pivoted toward or away from the adjacent side walls 24 and 26 to closed or opened positions relative to the entire housing 20. The closed position of the first and second doors 34 and 36 on the housing 20 is shown in FIG. 1.

In addition, the bottom wall 28 carried a pair of outwardly extending clips 38, each of which has an interior aperture 40 A lock member 42 is pivotally attached to a bottom edge of each of the first and second doors 34 and 36. The free end of each clip 42 has an aperture 44 which is suited for receiving a wire or plastic padlock seal member for tamper indication. The free end of each clip 42 is pivotally movable into and out of the respective apertures 40 and the clips 38.

A hub opening with hub closure plate 50 is mounted on the top wall 22.

As shown in FIG. 3, the bottom wall 28 of the housing 20 includes a plurality of knockouts to allow the passage of electrical conductors, such as electrical power distribution load conductors connectable to a building electrical power distribution network, to be inserted. By way of example only, a plurality, such as four one inch diameter knockouts 52 are formed in the bottom wall 28. Additional knockouts 54 may also be formed in the bottom wall 28.

In addition, one or more optional knockouts 56, with two optional knockouts 56 shown by way of example only, may be formed in the rear wall 30 as seen in FIG. 2.

The second door 36 has a raised lip 60 surrounding an aperture 62 to form a ringless-style mount through which an end portion of the dome or housing 14 of the watthour meter 12 projects when the watthour meter 12 is mounted in the socket 10.

A barrier or interior wall 64 is mounted within the interior of the socket housing 20. The barrier 64 which may be formed of the same material as the housing 20, such as a powdered coated metal or galvanized metal, extends substantially completely between the top wall 22 and the bottom wall 28 intermediate the side walls 24 and 26 provided arc flash protection. The barrier 64 extends substantially the entire depth of the side walls 24 and 26 between the rear wall 30 and the front edges 25 and 27 of the side walls 24 and 26, respectively.

The exterior edge of the wall 64 may optionally include a perpendicularly oriented flange to form a seat for the opposed inner edges of the first and second doors 24 and 26.

The exterior edges of the top wall 26, the side walls 24 and 26, the bottom wall 28 and the interior barrier or wall 64 cooperate to define first and second electrically isolated, independently accessible, compartments 70 and 72, respectively, within the housing 20. The first compartment 70 is accessible only through the first access control components or door 34. The second compartment 72 is accessible only through the second access control component door 36.

The first compartment 70 defines a first higher voltage compartment for high voltage equipment. By way of example only, the first compartment 70 is configured for receiving 480V/440V (600V in Canada) electrical equipment and/or connections. The higher voltage equipment are those electrical components, connections or equipment which under the appropriate electrical codes require the use of personal protective equipment (PPE). The use of such personal protective equipment is typically associated with the exposure to 480V/440V US or 600V Canada or higher voltages on electrical equipment, connections or components.

The second compartment 72 defines a second lower voltage compartment suitable for receiving lower voltage equipment, such as a watthour meter components, including a meter base, watthour meter test switches, etc. By way of example only, the second compartment 72 is configured for 120V/110V equipment. By way of example only, the second compartment 72 receives a removable block bridge 80 which is mounted to the rear wall 30 by a plurality of fasteners. The block bridge 80 has a pair of end mounting flanges which receive the fasteners and a raised central portion 82 which receives a multi-terminal block assembly 84. In an example for three-phase electrical service, the block 84 is adapted for plug-in connection with the blade terminals 18 of a watthour meter 12. The block 84 includes an insulated housing 86 having individual slots for receiving a plurality of jaw contacts, all denoted by reference number 88. Each jaw contact 88 is fixedly mounted on the housing 86 and has a terminal end for connection to a conductor 100 extending between the block 84 and 88 the test switch assembly 101.

Any number of jaw contacts 88 may be provided depending upon whether or not the meter socket 10 is for single or three phase electrical power service. Potential contacts 88 also be mounted in the housing 86 and connected by conductors 100 to selected test switches 101.

By way of example only, side mounting guards may be provided adjacent opposite side ends of the housing 86 to act as a centering guide for a watthour meter 12 during insertion of the watthour meter socket 12 into the block 84.

For the exemplary three-phase service, the block assembly 84 includes eight terminal and eight individual jaws 88 which respectively receive the blade terminals 18 of the watthour meter 12 in a plug-in connection. Seven small potential/KYZ (pulse output) jaws 89 may also be provided in the block 84.

It will also be understood that the block 84 may be replaced by a bottom feed to socket-type adapter, such as an Ekstrom Industries, Inc., 2100 Series Adapter, which similarly receives a plug-in watthour meter 12.

As described previously, the 480 volt electrical power line conductors pass through the knockouts 52 and 54 in the bottom wall 28 of the housing 20. The lower 120 volt electrical power line distribution conductors pass through the knockouts 52 and 54 in the second compartment portion of the bottom wall 28. Due to the barrier 64, the higher 480 volt service is confined to the first compartment 70; while the lower 120 volt power is confined to the second compartment 72. The higher 480 volt power in the first compartment 70 is electrically isolated from the second compartment 72.

Voltage conversion or transformation means are mountable in the first compartment 70 to convert the 480 volt incoming electric power to the lower 120 volt power used by the watthour meter 12 in the second compartment 72.

As shown in FIG. 2 for one aspect of the housing 20, the conductors 100 may be pre-connected between the terminals of the meter block 84 and the terminals on the meter switches 101. The output terminals on the meter switches 101 are connected by a harness or a plurality of conductors denoted by reference number 102. The harness or conductors 102 pass through an opening 104, which may have a grommet mounted therein for wire protection, to the first compartment 70 wherein the individual conductors of the harness 102 are connected to the voltage conversion means.

The watthour meter socket 10 may be manufactured and sold in the configuration shown in FIG. 2 without any voltage conversion means mounted in the first compartment 70. The voltage conversion means is then added by the end user utility or utility contractor prior to or at the use site where the watthour meter socket 10 is to be installed. Alternately, in the aspects shown in FIGS. 4 and 5, the voltage conversion means may be pre-mounted in the first compartment 70 and pre-wired to the harness 102 thereby enabling the watthour meter 12 to be simply installed in the socket 10 at the use site without requiring extensive on-site installation except for connection of the electric power line and load conductors as described above.

In one aspect shown in FIG. 2, a mounting plate 110 is fixed by fasteners to the portion of the rear wall 30 located in the first compartment 70. The mounting plate 110 may have pre-formed mounting apertures 112 located at mounting positions for receiving individual voltage transformers 114 and 116, shown in FIG. 4, each of which converts high voltage service low voltage service, for example 480V to 120V.

As described above, the voltage transformers 114 and 116 may be connected to the conductors of the harness 102 at the socket adapter manufacturing facility, or later during the meter installation process.

Figure 5:
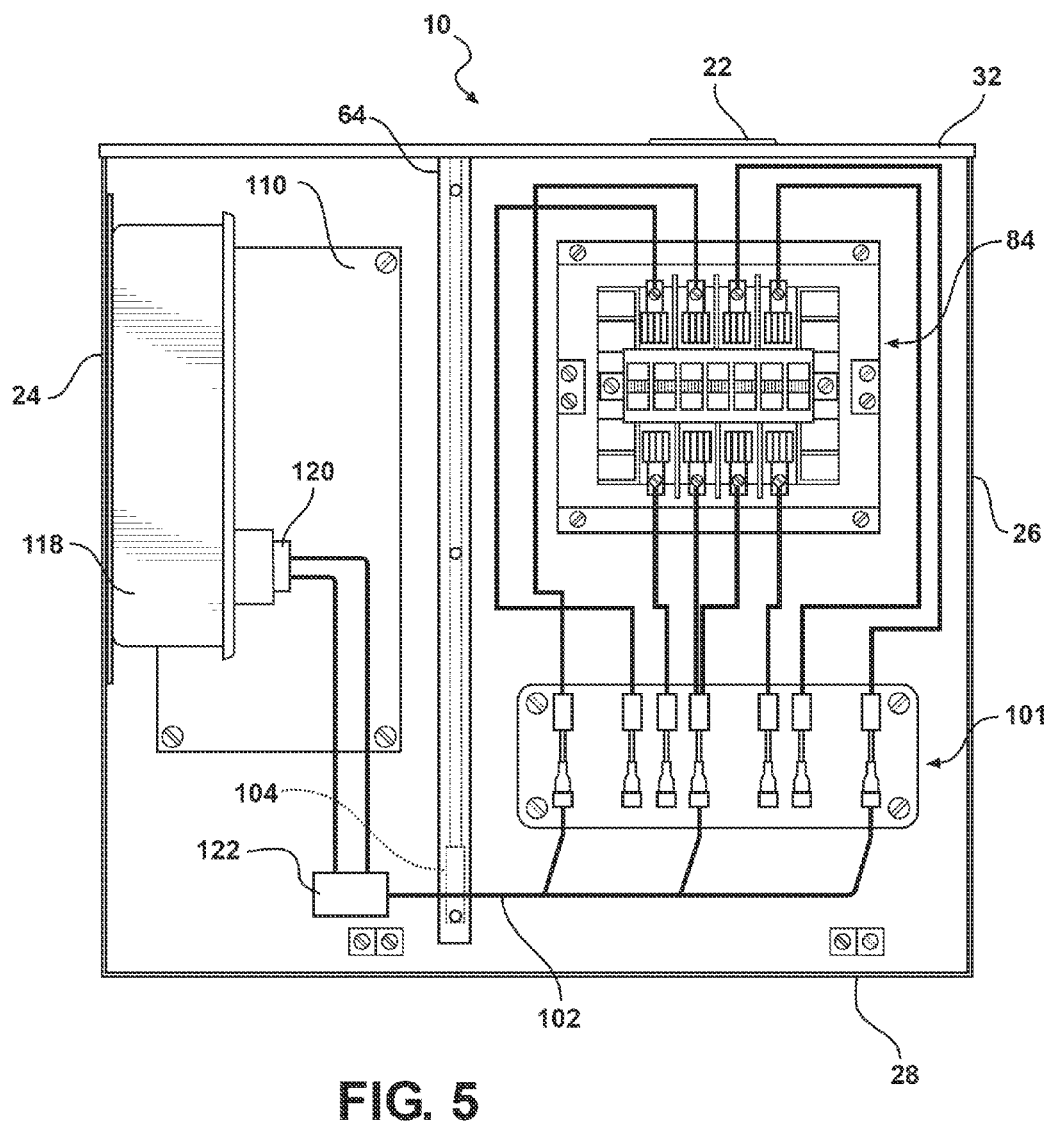
FIG. 5 is a front elevational view of a watthour meter socket with a second aspect of a voltage conversion means.

In another aspect shown in FIG. 5, the voltage conversion means includes a 4:1 ratio VT pack sold by Two-Sockets-Two Meters, Inc., of South Dakota. By way of example only, the VT pack 118 includes a plurality of transformer-rated 480V/120V transformers. The transformers are pre-wired to a Molex connector. A Molex connection or plug 120, shown in FIGS. 2 and 5, 15 coupled to one end of the conductors of the wiring harness 102. Other conductors from the VT pack 118 are coupled to a terminal block 122 mounted on the rear wall 30 within the first compartment 70 of the socket adapter 10.

Figure 4:
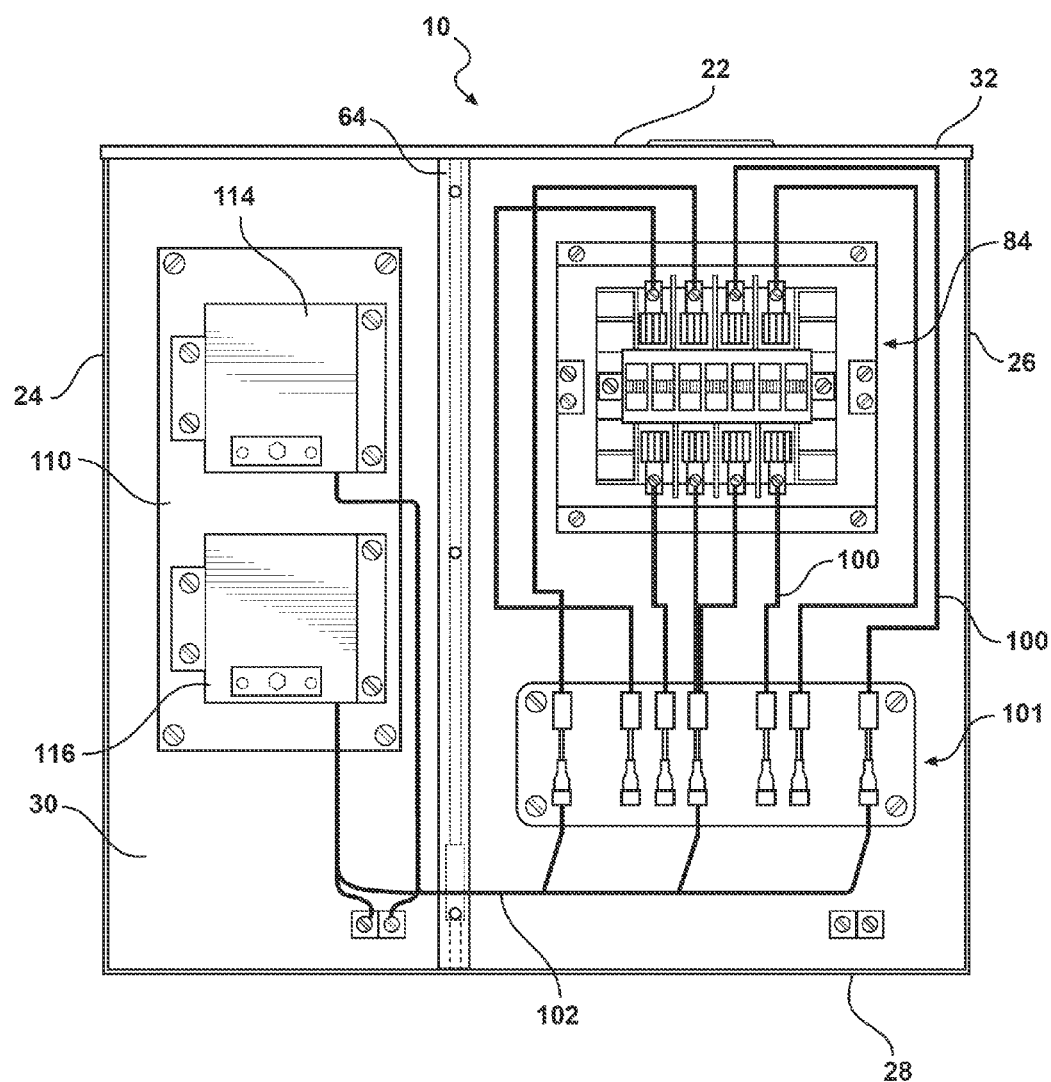
FIG. 4 is a frontal elevational view of the socket shown in FIG. 1, including one aspect of a voltage conversion means.

In use, the watthour meter socket 10 having the individual voltage transformers 114 and 116 shown in FIG. 4 or the VT pack 118 shown in FIG. 5 mounted and connected to the wiring harness 102 is mounted on a suitable surface at the electric power use site. The first cover or door 34 is pivotally coupled to the lip 32 on the socket adapter housing 20 and pivoted to a closed position enabling one end of the lock 42 to be pivoted into the aperture 40 in the clip 38 and sealed by a wire or padlock seal. This completely encloses, contains and isolates the higher 480 volt electric power within the first compartment 70 of the watthour meter socket housing 20 from the second compartment 72.

The watthour meter 12 is then inserted into the meter base 84 and the second cover 36 pivotally attached at one end to the lip 32 of the housing 20 and moved to a closed position. The lock 44 is then pivoted to the closed position within the aperture 40 of the clip 38 and sealed by a wire or padlock seal, not shown. This completes the initial installation of the watthour meter 12 and the watthour meter socket 10.

If at any time the watthour meter 12 needs to be repaired, removed and/or a new watthour meter 12 installed, the electric utility person need only remove any existing padlock or wire seal and unlatch the lock member 42 and then pivot and remove the second door 36 to expose the second compartment 72. The watthour meter 12 can then be removed through use of the meter test switches while maintaining electrical power service to the use site until a new watthour meter 12 is installed in the meter block 84. All of the work involved with the watthour meter 12 in the second compartment 70 is at the lower 120 volt level which does not require personal protection equipment for the electric utility personnel. This simplifies and expedites the meter replacement process.

Figure 6:
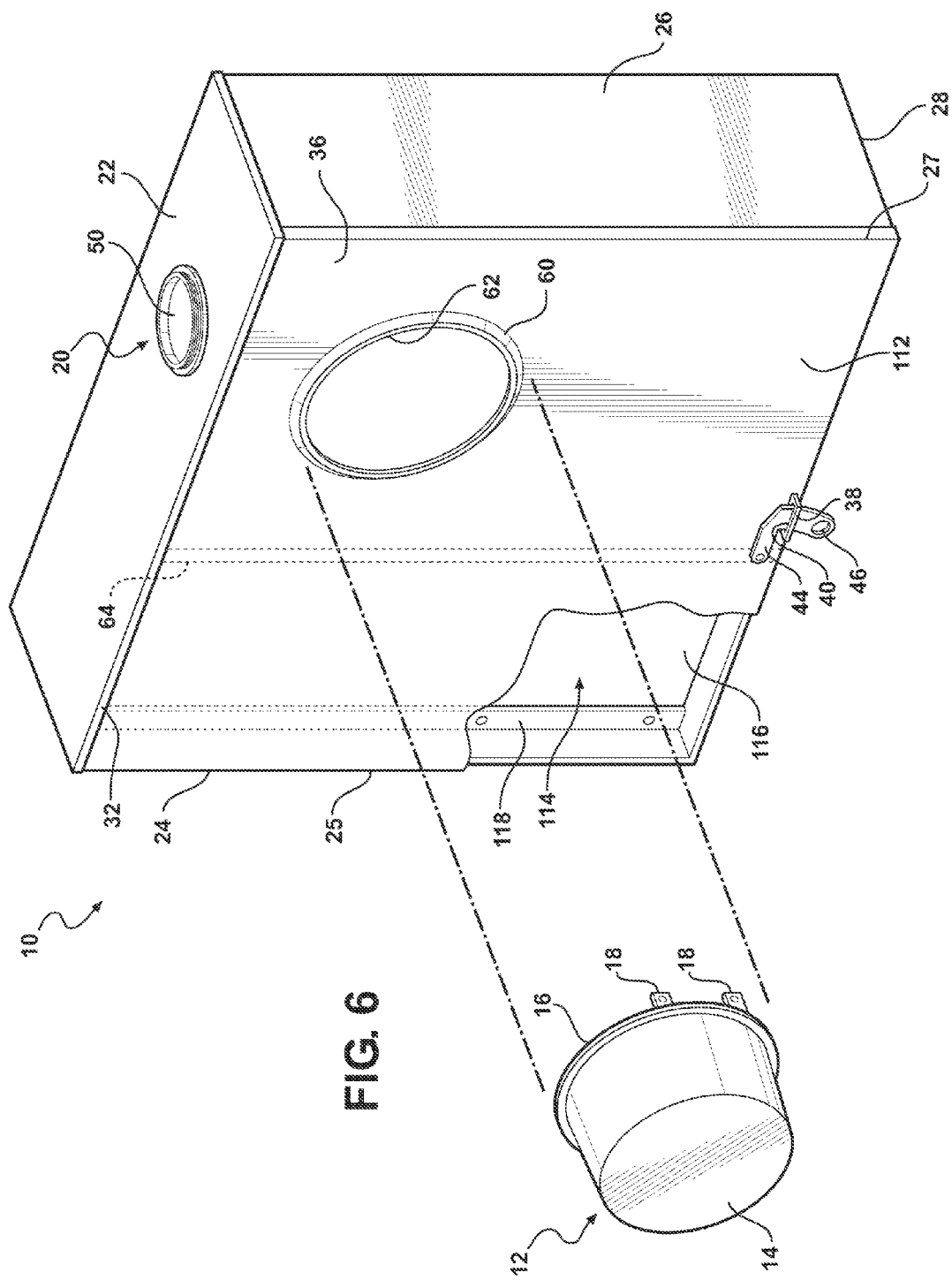
FIG. 6 is a perspective view of another aspect of a watthour meter socket with a sealed access sub-enclosure.

Referring now to FIG. 6, there is depicted another aspect of a electrical power service enclosure 110 having at least one sealed access sub-enclosure. The enclosure 110 includes a housing 20 and internal structure, including the interior barrier 64 which is substantially the same as the enclosure 10 described above and shown in FIGS. 1-5.

In this aspect, however, the separate covers or doors 34 and 36 of the enclosure 10 over the first and second sub-enclosure compartments 70 and 72, are replaced by a single large cover or door 112 which extends substantially completely across the open fronts of each sub enclosure or compartments 70 and 72 between the top and bottom walls 22 and 28 and the opposed side walls 24 and 26 of the housing 20. The single door 112 may be hingedly connected to the housing 20 by means of the slide in lip and edge 32 as described previously for the socket 10.

The single door 112 still includes the opening 62 for extension of the dome 14 of the watthour meter 12 through the door 112 when the watthour or utility meter 12 is mounted to the socket within the housing 20.

At least one clip 38 and lock member 42 are provided on the enclosure 20 and the door 112 for releasibly locking the door 112 to the housing 20.

As in the previous housing 20, the high voltage or high electric power rated equipment within the first sub-enclosure or compartment 70 requiring the use of personal protective equipment by the utility service person when the service person is exposed to the high voltage equipment, connections or components, is sealed from exposure by a sealed access means 114, such as an interior cover or panel 116. The interior panel 116 completely covers the interior opening of the first sub-compartment 70 between the sidewall 24, the interior barrier 64, the top wall 22 and the bottom wall 28. The panel 116 may be movably mounted within the housing 20 behind the door 112 by a slide in connection similar to that of the door 112 to the housing 20, a hinged connection 118 shown by exampled in FIG. 6, a removable screw-in mount, etc.

In operation, when the door 112 is removed from or pivoted to an upper open position exposing the interior of the housing 20, the high voltage electrical components housed within the first sub compartment or sub-enclosure 70 are still covered and blocked from exposure by the panel interior 116. This allows the utility service person to be able to open the enclosure 20 by pivotal movement and/or removal of the door 112 to service the low voltage, volt equipment within the second sub enclosure or compartment 72, including the installation or removal of the watthour meter 12 without having to don personal protective equipment since the high voltage equipment in the sub-enclosure 70 is covered from access, exposure, inadvertent contact, etc., by the panel 116.

If the service person needs to access the high voltage equipment within the first sub-compartment 70, the panel 116 can be moved to an opened position or removed from the housing 20 after the utility person dons the required personal protective equipment.

Figure 8:
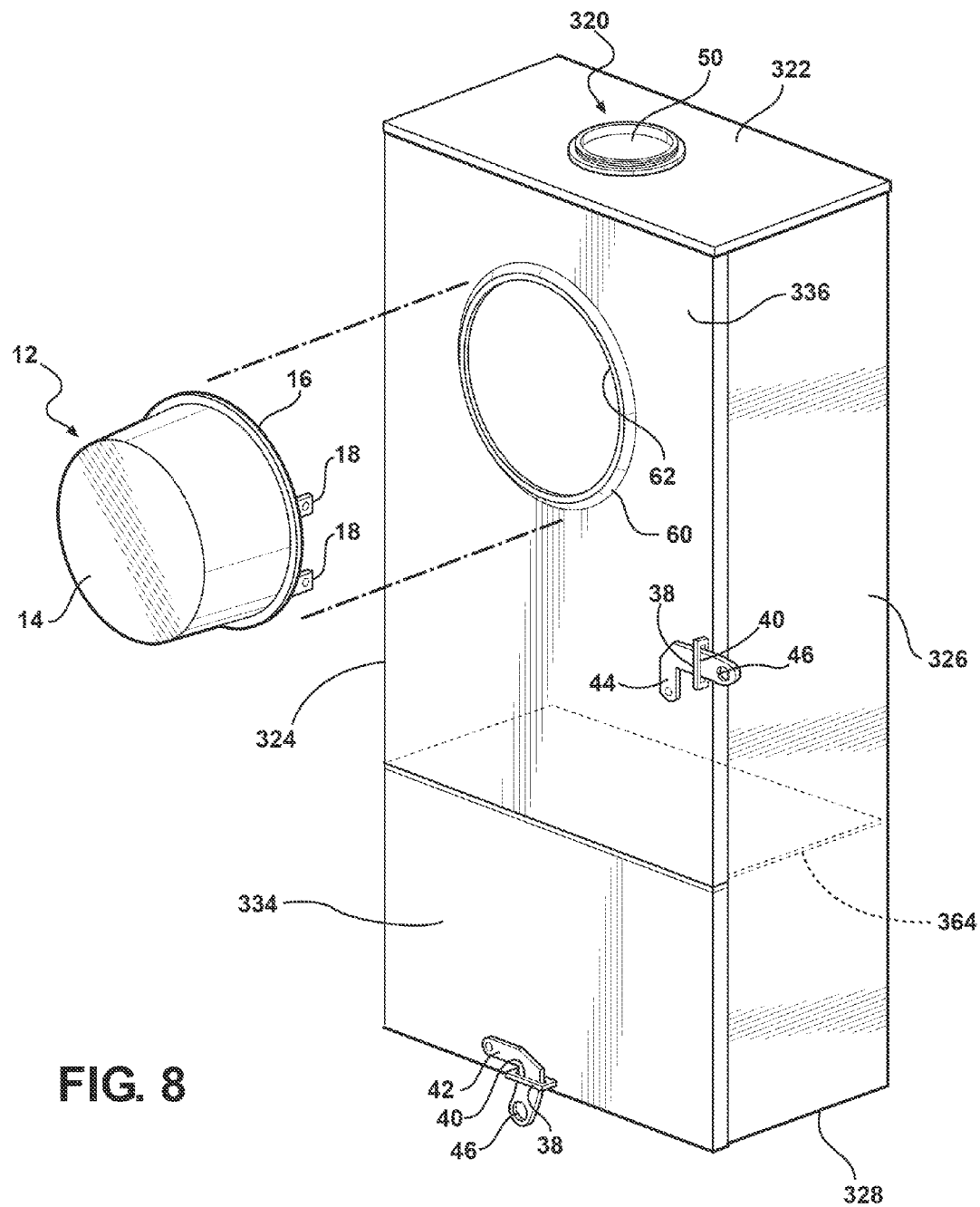
FIG. 8 is a perspective view of another aspect of a watthour meter socket with a sealed access sub-enclosure.

It will be understood that the side-by-side arrangement of the sub-compartments 70 and 72 for the enclosure 110 shown in FIG. 6, or the sub-compartments 70 and 72 for the enclosures 20 shown in FIGS. 1-5 which may be reoriented into a vertical side-by-side sub-compartment arrangement as shown in FIG. 8. In this aspect, the enclosure 320 is elongated in a vertical normal mounting direction. The internal barrier 364 is oriented generally horizontally between the sidewalls 24 and 26 and extends completely between the sidewalls 324 and 326 and from the rear wall 330 to a front edge 327 of the side walls 324 and 326.

Two doors 334 and 336, similar to doors 34 and 36, are mounted over respective sub-compartments in a vertical side-by-side orientation. The clips 38 and lock members 42 are mounted on the enclosure 320 and on each door 334 and 336 in an appropriate location for easy access.

It will also be understood that the two doors 334 and 336 in the configuration shown in FIG. 8 may be replaced by a single large door, such as door 112 shown in FIG. 6, with a separate interior cover or panel, similar to panel 114, disposed over the lower sub-compartment which receives the high voltage components.

The position of the high voltage components, such as the transformers 114, and the meter socket 84 in the horizontal side-by-side configuration shown in FIGS. 1-6 and in the vertical side-by-side configuration of FIG. 8 may be reversed.

Figure 7:
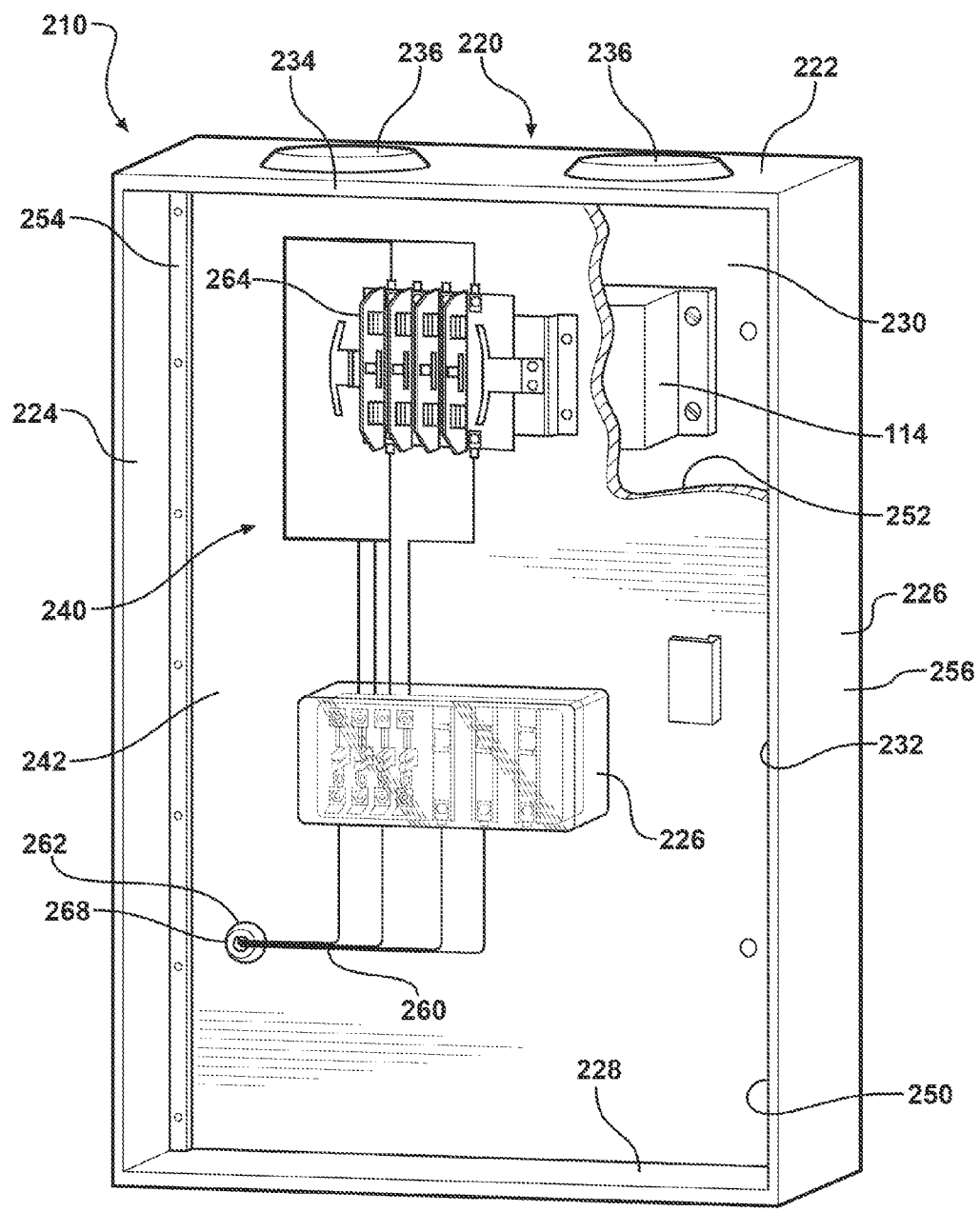
FIG. 7 is a perspective view of yet another aspect of a watthour meter socket with a sealed access sub-enclosure.

Referring now to FIG. 7, there is depicted another aspect of an electric power service device having a sealed access sub-enclosure or compartment portion which can contain high voltage equipment or components in a manner which enables the utility person to not have to don personal protective equipment when opening the housing to service the low voltage equipment mounted in the front portion of the housing as described hereafter.

As shown in FIG. 7, a utility meter socket 210 includes a housing 220 formed of joined, bent or otherwise fastened together top wall 222, opposed generally parallel sidewalls 224 and 226, a bottom wall 228 and a rear or back wall 230, all of which define an open front edge 232. A cover, not shown, but similar to one of the covers 34 and 36 shown in FIG. 1 may be removably or hingedly coupled to the housing 220 by means of the interconnecting flange on the cover and a lip 234 along the front edge of the top wall 222 of the housing 220.

High voltage components or electrical equipment, shown by way of example only, as a single 480V voltage transformer 114, are mounted on the backwall 230 or in the sub plate which is attached to the backwall 230. The high voltage components 114 are connected to high voltage utility line conductors, not shown, which enter the housing 220 through one or more hubs 236.

A sealed access means or member 240 is shown by way of example only as a single plate or panel 242. The panel 242 extends substantially completely between the inner surfaces of the top wall 220 and the opposed bottom wall 228, and between inner surfaces of the opposed side walls 224 and 226 to divide the housing 220 into a first sub enclosure or compartment 250 located in front of the panel 242 and a second rear located compartment or sub enclosure 252 located between the rear surface of the panel 242 and the rear wall 230 of the housing 220. The panel 242 completely covers and prevents contact with and exposure to the high voltage components, such as the voltage transformer 114, mounted in the rear compartment 252.

The sealed access means 240, such as the panel 242, is movably mounted within the housing 220 by slide in, hinged, threaded fasteners, or other connections which enable the panel 242 to be mounted in the position shown in FIG. 7 in which the panel 242 divides the interior of the housing 220 into the separately accessible first or front compartment 250 and the second or rear compartment 252. By way of example only, the panel 242 is illustrated as being coupled by a hinge 254 to the sidewall 224 of the housing 220. A latch or handle may be formed in the panel 242 to facilitate a pivotal movement of the panel 242 about the hinge 254 between the closed, sealed access position shown in FIG. 7 in which the panel 242 completely blocks the rear sub-enclosure 252 and the high voltage components mounted therein from exposure thereby enabling the utility person to service the low voltage equipment in the front compartment 250 without personal protective equipment, and a second opened position where the panel 242 and the lower voltage equipment mounted thereon may be pivoted about the hinge 254 to an opened position exposing the high voltage equipment 114 in the rear sub-enclosure 252 to a view. In this case, the utility service person must don the code required personal protective equipment when the panel 242 is in the open position exposing the high voltage component 114 to contact or access.

The voltage transformers 114 and current transformers, 115 shown in FIG. 9 transform the high voltage in the rear compartment 252 to a lower 120 VAC. Conductors 260 extending from the lower voltage terminals of the high voltage equipment pass through an aperture 262 in the panel 242 to a meter socket 264 or indirectly to the meter socket 264 through test switches 266 a described in the previous aspects of the meter socket. A rubber grommet 268 may be mounted in the aperture 262.

What is claimed is:

1. A meter socket comprising:
a single enclosure;
a first sub-enclosure disposed entirely within the interior of the single enclosure and at least partially defined by the single enclosure, the first sub-enclosure containing high voltage electrical components including a current transformer coupled to high voltage power conductors and having lower voltage secondary conductors; and
a second sub-enclosure disposed entirely within the interior of the single enclosure, and at least partially defined by the single enclosure, and accessibly isolated from the first sub-enclosure, the second sub-enclosure containing lower voltage utility watthour meter socket and meter test switch connections for bypassing the watthour meter socket;
the first and second sub-enclosures electrically isolating the high voltage electrical components from the lower voltage electrical components; and
an access control component associated with the first and second sub-enclosures, the access control component blocking access to the first sub-enclosure when allowing access to the second sub-enclosure.

2. The meter socket of claim 1 further comprising:
the access control component controlling access to the first sub-enclosure independently of access to the second sub-enclosure.

3. The meter socket of claim 2 wherein:
the access control component substantially blocks access to an interior of the first sub-enclosure.

4. The meter socket of claim 1 further comprising:
an interior barrier separating the single enclosure into the first and second sub-enclosures.

5. The meter socket of claim 4 wherein:
the first and second sub-enclosures are disposed horizontally side-by-side.

6. The meter socket of claim 4 further comprising:
first and second covers respectively mounted over the first and second sub-enclosures allowing independent and electrically isolated access to the components in each of the first and second sub-enclosures.

7. The meter socket of claim 4 wherein:
the first and second sub-enclosures are disposed one of horizontally and vertically side-by-side in the single enclosure.

8. The meter socket of claim 7 further comprising:
first and second covers respectively mounted over the first and second sub-enclosures allowing independent and electrically isolated access to the components in each of the first and second sub-enclosures.

* * * * *